United States Patent
Park et al.

(10) Patent No.: US 8,638,777 B2
(45) Date of Patent: Jan. 28, 2014

(54) METHOD FOR PERFORMING RANGING IN WIRELESS COMMUNICATION SYSTEM SUPPORTING TWO WIRELESS COMMUNICATION SCHEMES

(75) Inventors: Kyu Jin Park, Seoul (KR); Jae Hoon Chung, Yongin-Si (KR); Han Gyu Cho, Seoul (KR); Eun Jong Lee, Yongin-Si (KR); Doo Hyun Sung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 12/863,032

(22) PCT Filed: Mar. 27, 2009

(86) PCT No.: PCT/KR2009/001561
§ 371 (c)(1),
(2), (4) Date: Jul. 15, 2010

(87) PCT Pub. No.: WO2009/120031
PCT Pub. Date: Oct. 1, 2009

(65) Prior Publication Data
US 2011/0051667 A1  Mar. 3, 2011

Related U.S. Application Data

(60) Provisional application No. 61/040,139, filed on Mar. 27, 2008.

(30) Foreign Application Priority Data

Mar. 16, 2009 (KR) .................. 10-2009-0022077

(51) Int. Cl.
*H04J 3/06* (2006.01)
*H04W 4/00* (2009.01)

(52) U.S. Cl.
USPC ........................... 370/350; 370/328

(58) Field of Classification Search
USPC .................. 370/328, 338, 350, 503
See application file for complete search history.

(56) References Cited

U.S. PATENT DOCUMENTS

| 7,613,148 | B2* | 11/2009 | Hong et al. ............... 370/331 |
| 8,159,979 | B2* | 4/2012 | Lee et al. ................ 370/280 |
| 2001/0013595 | A1* | 8/2001 | Wilding ................ 256/13.1 |
| 2006/0120329 | A1* | 6/2006 | Kim et al. .............. 370/331 |
| 2006/0194579 | A1 | 8/2006 | Leung et al. |
| 2007/0025297 | A1* | 2/2007 | Lee et al. ................ 370/331 |

(Continued)

FOREIGN PATENT DOCUMENTS

| CN | 1846376 | | 10/2006 | |
| JP | 2007-214920 A | | 8/2007 | |
| KR | 10-2006-0137752 | * | 7/2008 | ............... H04B 7/26 |
| KR | 10-2008-0062234 A | | 7/2008 | |

*Primary Examiner* — Warner Wong
(74) *Attorney, Agent, or Firm* — McKenna Long & Aldridge LLP

(57) ABSTRACT

A method for performing ranging is disclosed. The method for performing ranging in a wireless communication system which simultaneously supports a legacy system and a new system includes a method for additionally allocating a ranging channel to a zone other than a legacy zone and a method for re-using a legacy ranging channel within the legacy zone. When the legacy ranging channel is re-used, ranging codes may be shared by a legacy mobile station and a new system mobile station or may be separated on a ranging code domain. Limited radio resources can be effectively employed by re-using the legacy ranging channel.

8 Claims, 9 Drawing Sheets

(56) References Cited

U.S. PATENT DOCUMENTS

| | | | |
|---|---|---|---|
| 2007/0133492 A1* | 6/2007 | Baek et al. | 370/338 |
| 2007/0230401 A1* | 10/2007 | Rayzman et al. | 370/331 |
| 2008/0062907 A1 | 3/2008 | Hart et al. | |
| 2009/0092085 A1* | 4/2009 | Ramesh et al. | 370/329 |
| 2009/0131110 A1* | 5/2009 | Balachandran et al. | 455/561 |
| 2009/0161616 A1* | 6/2009 | Ramesh et al. | 370/329 |
| 2011/0019622 A1* | 1/2011 | Lee et al. | 370/328 |
| 2011/0211571 A1* | 9/2011 | Ryu et al. | 370/350 |

* cited by examiner

METHOD FOR PERFORMING RANGING IN WIRELESS COMMUNICATION SYSTEM SUPPORTING TWO WIRELESS COMMUNICATION SCHEMES

This application is a national phase application based on International Application No. PCT/KR2009/001561, filed on Mar. 27, 2009, which claims priority to U.S. Provisional Application No. 61/040,139, filed on Mar. 27, 2008 and Korean Patent Application No. 10-2009-0022077, filed on Mar. 16, 2009, all of which are incorporated by reference for all purposes as if fully set forth herein.

TECHNICAL FIELD

The present invention relates to a wireless communication system, and more particularly, to a method for performing ranging in a wireless communication system which simultaneously supports two wireless communication schemes.

BACKGROUND ART

To receive and demodulate data of a wireless communication system, synchronization is required between a transmitter and a receiver. Especially, to successfully transmit and receive data in a wireless communication system in which a channel environment between a base station and a mobile station varies continuously, synchronization should be acquired through signaling between the base station and the mobile station. In downlink, since the base station simultaneously transmits a signal to a plurality of mobile stations in a reference timing, a synchronization problem does not occur. In uplink, however, since respective signals transmitted by multiple mobile stations arrive unequally, a propagation delay may be differently generated. Accordingly, an additional timing synchronization method is needed and one such method is ranging. Namely, ranging is a procedure for causing multiple mobile stations to correctly acquire synchronization for a transmission time.

A plurality of mobile stations acquires downlink synchronization using a data frame transmitted by a base station. As one method for the mobile stations to acquire synchronization, the base station may insert a preamble for synchronization in a part of a transmission frame. Therefore, the mobile stations acquire synchronization for a downlink channel through the preamble. Alternatively, the base station may use an additional synchronization channel.

In uplink, each mobile station should transmit data to the base station through a time zone and/or a frequency zone allocated thereto so that interference between mobile stations can be prevented and the base station can receive the data. Accordingly, synchronization acquisition through signaling between the base station and the mobile station in consideration of a channel environment of each mobile station is required for uplink synchronization.

Initial ranging refers to a process for obtaining accurate timing offset between a mobile station and a base station and initially adjusting transmission power. If a power source of the mobile station enters an ON state, the mobile station acquires downlink synchronization from a received downlink preamble signal. The mobile station then performs initial ranging to control an uplink timing offset and transmission power. Unlike the initial ranging, periodic ranging refers to a process for periodically tracking the uplink timing offset and received signal strength after the initial ranging. Bandwidth request ranging refers to a process for the mobile station to request that the base station allocate a bandwidth. Handover ranging is performed by the mobile station for synchronization with another base station during handover.

A wideband wireless communication system is based on orthogonal frequency division multiplexing (OFDM) scheme or orthogonal frequency division multiple access (OFDMA) scheme and can transmit data at a high rate by transmitting a physical channel signal using a plurality of subcarriers.

Standardization for a wireless access scheme of the wideband wireless communication system is conducted by the institute of electrical and electronics engineers (IEEE) 802.16 standardization group which is an international organization for standardization. The wireless communication system has evolved in a manner of improving a transmission rate compared to a conventional system by specification change or solving problems in terms of implementation of the conventional system.

A legacy system refers to a system conforming to a conventional specification and corresponds to a conventional system. For example, an IEEE 802.16e system corresponds to a legacy system. However, the legacy system is not limited only to the IEEE 802.16e system. A new system evolving from the conventional system may be installed in an area in which the legacy system is installed. In this case, the new system should be able to support a service to a new mobile terminal as well as a legacy mobile terminal.

A 16 m mobile station of an IEEE 802.16m system should perform a ranging process with a base station for initial access and bandwidth request. However, a ranging channel or ranging configuration information used when the 16 m mobile station performs the ranging process in a system supporting a legacy mode has not been specifically defined yet.

DISCLOSURE OF INVENTION

Technical Problem

An object of the present invention devised to solve the problem lies in providing a ranging method which can effectively use radio resources in a wireless communication system which simultaneously supports two communication schemes.

Technical Solution

The object of the present invention can be achieved by providing a method for performing, at a mobile station, ranging in a wireless communication system which simultaneously supports a first communication scheme and a second communication scheme. The method includes receiving, at a second mobile station using the second communication scheme, system information, which includes information indicating a ranging channel to be used by the second mobile station, from a base station, and selecting a second ranging code distinguished from a first ranging code used by a first mobile station using the first communication scheme within a ranging code region and transmitting the selected second ranging code to the base station through a ranging channel according to the first communication scheme, when the system information indicates that the second mobile station uses the ranging channel according to the first communication scheme.

In another aspect of the present invention, provided herein is a method for performing, at a mobile station, ranging in a wireless communication system which simultaneously supports a first communication scheme and a second communication scheme. The method includes receiving, at a second mobile station using the second communication scheme, system information, which includes information indicating a ranging channel to be used by the second mobile station, from a base station, and transmitting a ranging code selected arbitrarily from the same code set used by a first mobile station using the first communication scheme to the base station through a ranging channel according to the first communication scheme, when the system information indicates that the second mobile station uses the ranging channel according to the first communication scheme.

In a further aspect of the present invention, provided herein is a method for performing, at a base station, ranging in a wireless communication system which simultaneously supports a first communication scheme and a second communication scheme. The method includes transmitting system information, which includes information indicating a ranging channel to be used by a second mobile station using the second communication scheme, to the second mobile station, and receiving a second ranging code distinguished from a first ranging code used by a first mobile station using the first communication scheme within a ranging code region through a ranging channel according to the first communication scheme, when the system information indicates that the second mobile station uses the ranging channel according to the first communication scheme.

The method may further include transmitting, at the second mobile station, the second ranging code to the base station through a second ranging channel according to the second communication scheme, when the system information indicates that the second mobile station uses the ranging channel according to the second communication scheme.

The method may further include transmitting, at the second mobile station, a message for a zone switching request to the base station so that the second mobile station using the second communication scheme transmits data in a zone different from a zone used by the first mobile station using the first communication scheme, and receiving a message for accepting the zone switching request from the base station.

The system information may further include ranging code configuration information.

Advantageous Effects

According to a ranging performing method of the present invention, radio resources can be effectively employed by re-using a ranging channel of a legacy mobile station without allocating an additional ranging channel.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. The same reference numbers will be used throughout this specification to refer to the same or like parts.

The term 'base station' may be replaced with the term 'fixed station', 'Node B', 'eNode B' (eNB), 'access point', etc. The term 'mobile station' may be replaced with the term 'user equipment' (UE), 'subscriber station' (SS), 'mobile subscriber station' (MSS), 'mobile terminal', etc.

A transmitting end refers to a node which transmits a data or voice service and a receiving end refers to a node which receives a data or voice service. Therefore, in uplink, a mobile station may correspond to the transmitting end and a base station may correspond to the receiving end. Similarly, in downlink, the mobile station may correspond to the receiving end and the base station may correspond to the transmitting end.

A mobile station of the present invention may be a personal digital assistant (PDA), a cellular phone, a personal communication service (PCS) phone, a global system for mobile (GSM) phone, a wideband code division multiple access (wideband CDMA) phone, a mobile broadband system (MBS) phone, etc.

Figure 1:
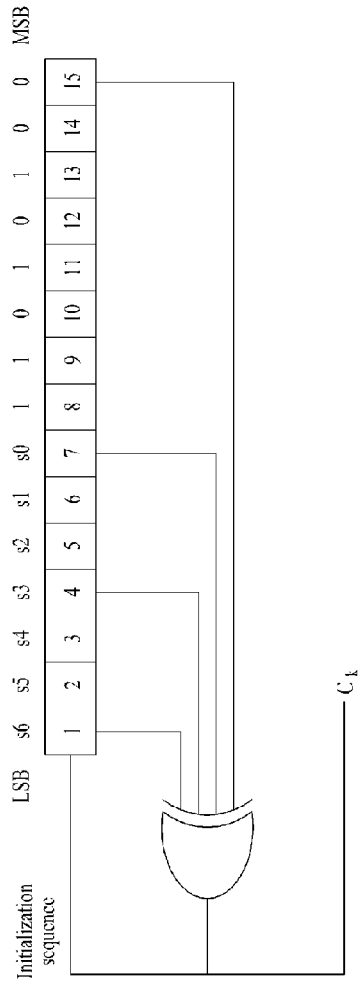
FIG. 1 is a diagram illustrating an example of a pseudo random binary sequence (PRBS) generator for generating a ranging code in an IEEE 802.16e system.

FIG. 1 is a diagram illustrating an example of a pseudo random binary sequence (PRBS) generator for generating a ranging code in an IEEE (Institute of Electrical and Electronics Engineers) 802.16e system.

Referring to FIG. 1, a polynomial generator $1+X^1+X^4+X^7+X^{15}$ is shown. A sequence generated at an output Ck is a ranging code. 257 orthogonal codes of a 144-bit length generated through the PRBS generator are divided into codes for initial ranging, codes for handover ranging, codes for periodic ranging, and codes for bandwidth request (BR) ranging according to purposes. A mobile station selects any one code from a code set belonging to ranging which is performed among the 256 orthogonal codes.

A 144-bit ranging code is modulated onto subcarriers belonging to a group of 6 (or 8) subchannels. A plurality of subchannels in which a ranging code is modulated is called a ranging subchannel.

Figure 2:
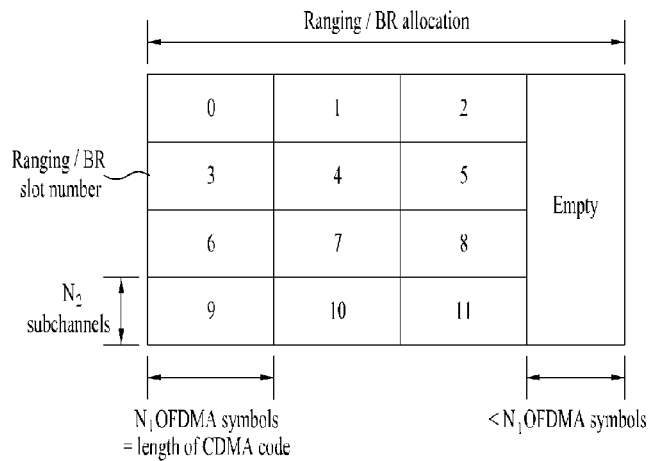
FIG. 2 is a diagram illustrating a ranging slot structure in an IEEE 802.16e system.

FIG. 2 is a diagram illustrating a ranging slot structure in an IEEE 802.16e system.

Referring to FIG. 2, the ranging slot includes N1 OFDMA symbols and N2 subchannels. The ranging slot is also called a ranging opportunity size. N1 is the number of OFDMA symbols necessary for transmission of a ranging code, and N2 is the number of subchannels necessary for transmission of the ranging code. A mobile station may arbitrarily select a slot to perform ranging.

The mobile station may arbitrarily select the ranging code and the ranging slot. Since a plurality of mobile stations is present within one cell, two or more mobile stations may simultaneously attempt to perform ranging using the same ranging code and the same ranging slot. A ranging request message is transmitted through the ranging slot. Mobile stations that transmit the ranging request message through the same ranging slot at the same time enter a contention state. In a ranging process, if two or more mobile stations simultaneously select the same ranging code and transmit the ranging code through the same ranging slot to the base station, collision may occur.

Figure 3:
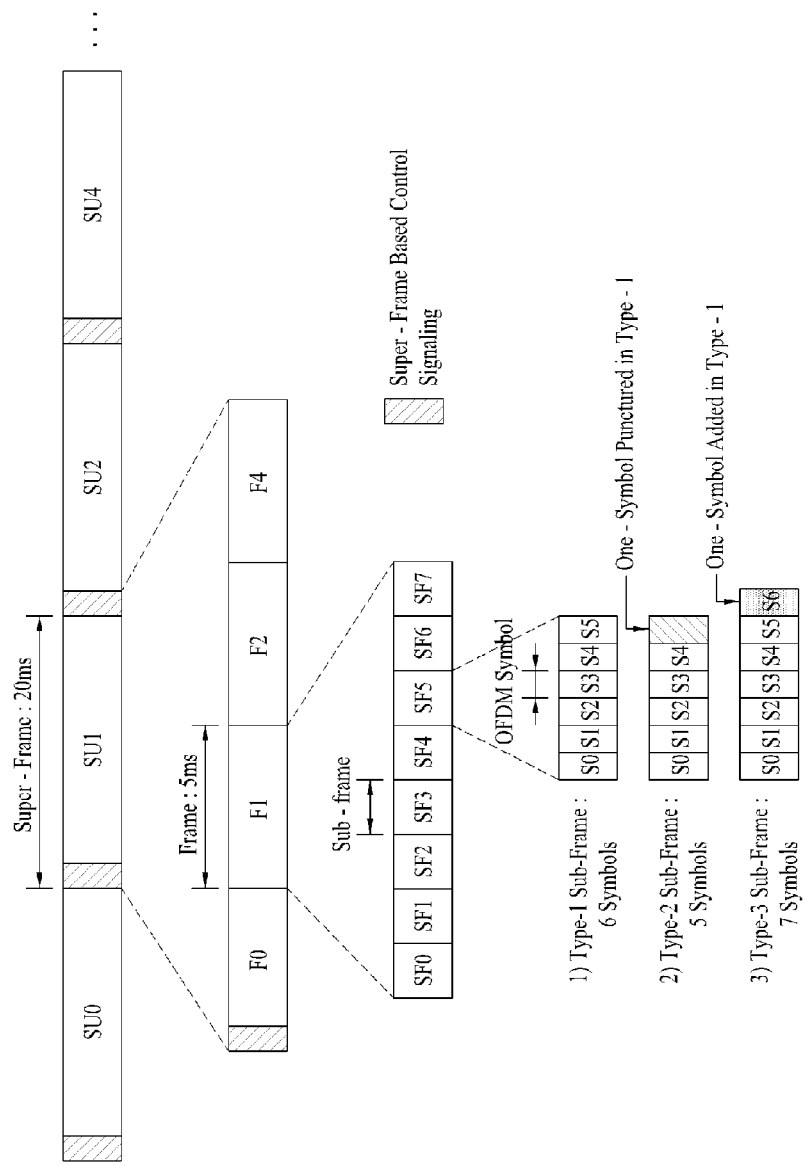
FIG. 3 is a diagram illustrating a new frame structure in an IEEE 802.16m system.

FIG. 3 is a diagram illustrating a new frame structure in an IEEE 802.16m system.

Referring to FIG. 3, each 20 ms superframe is divided into four 5 ms frames and begins with superframe-based control signaling. Each 5 ms frame may be further divided into 8 subframes. There are three types of subframes: the type-1 subframe consisting of 6 OFDM symbols; the type-2 subframe consisting of 5 OFDM symbols due to puncturing of one symbol; and the type-3 subframe consisting of 7 OFDM symbols due to addition of one symbol. A time division duplexing (TDD) or frequency division duplexing (FDD) scheme may be applied to such a basic frame structure.

Figure 4:
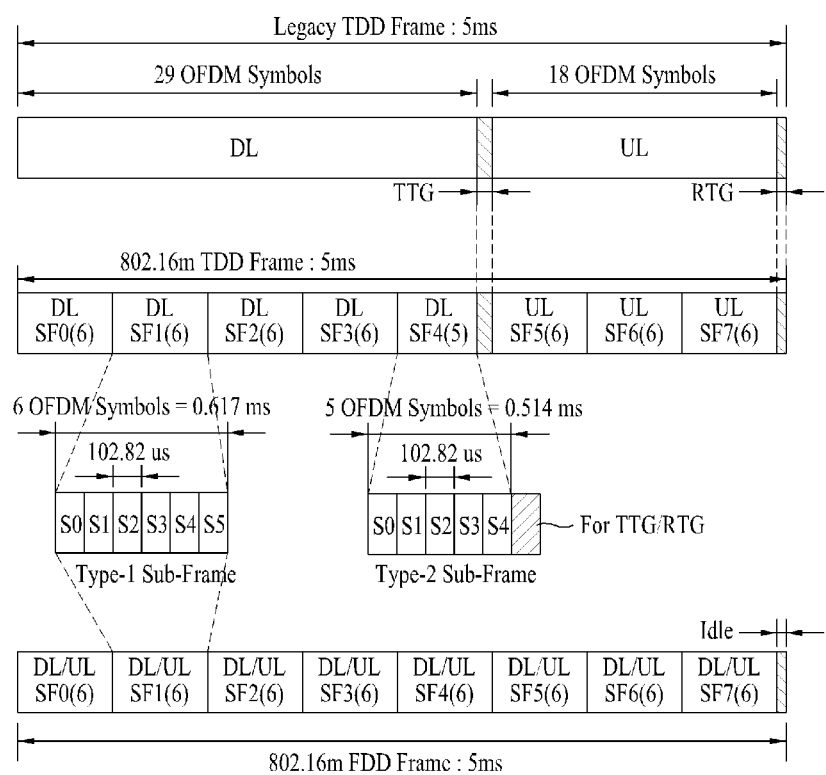
FIG. 4 is a diagram illustrating a frame structure for supporting a legacy mode in an IEEE 802.16m system.

FIG. 4 is a diagram illustrating a frame structure for supporting a legacy mode in an IEEE 802.16m system.

Referring to FIG. 4, a 5 ms legacy TDD frame includes a downlink (DL) having 29 OFDM symbols, an uplink (UL) having 18 OFDM symbols, a transmit/receive transition gap (TTG) that is a gap between a DL burst and a subsequent UL burst, and a receive/transmit transition gap (RTG) that is a gap between a UL burst and a subsequent DL burst. The DL may be divided into 5 DL subframes and the UL may be divided into 3 UL subframes. Each of the DL subframes may include 6 OFDM symbols, each of 102.82 μs. However, since one OFDM symbol of the last DL subframe among the DL subframes may be used for a TTG/RTG, the last DL subframe may include 5 OFDM symbols.

Figure 5:
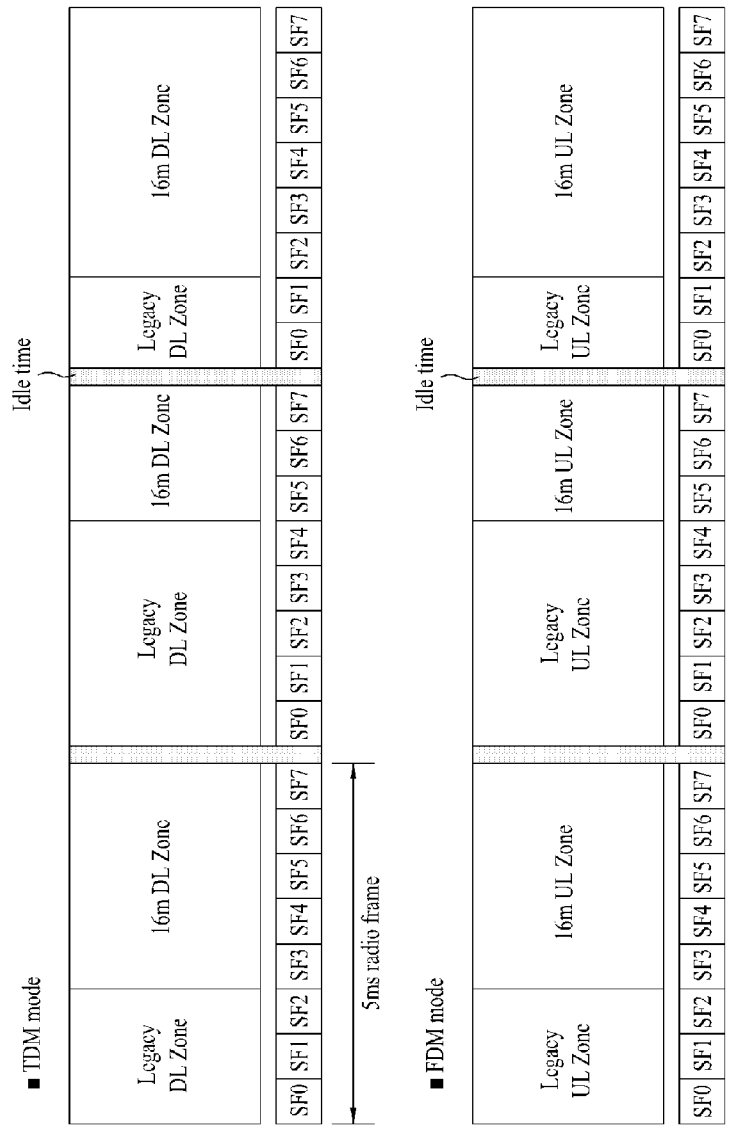
FIG. 5 is a diagram illustrating a time zone in FDD for supporting a legacy mode.

FIG. 5 is a diagram illustrating a time zone in FDD for supporting a legacy mode. Referring to FIG. 5, a legacy DL zone and a 16 m DL zone are frequency division duplexed in one legacy frame with a legacy UL zone and a 16 m UL zone. An idle time is present every two legacy frames.

Figure 6:
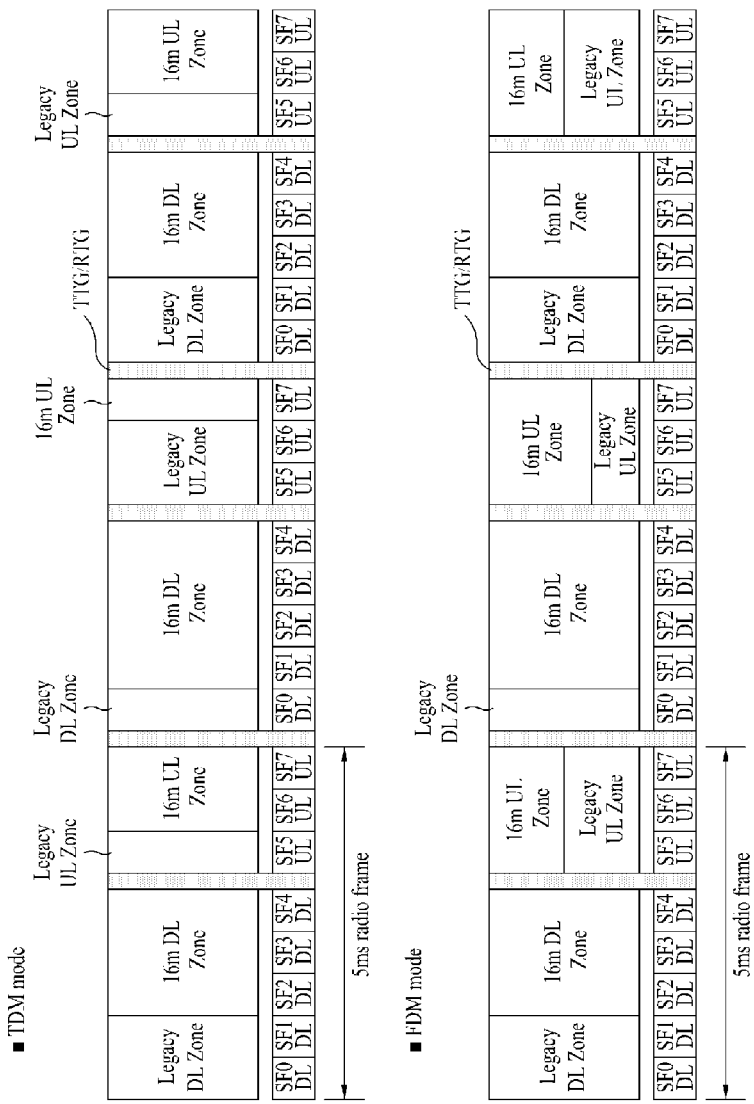
FIG. 6 is a diagram illustrating a time zone in TDD for supporting a legacy mode.

FIG. 6 is a diagram illustrating a time zone in TDD for supporting a legacy mode. Referring to FIG. 6, a time zone in TDD includes a time division multiplexing (TDM) mode and a frequency division multiplexing (FDM) mode.

In the TDM mode, a legacy UL zone and a 16 m UL zone may be time division multiplexed in a UL subframe within one legacy frame. Moreover, in the FDM mode, the legacy UL zone and the 16 m UL zone may be frequency division multiplexed in the UL subframe within one legacy frame.

Figure 7:
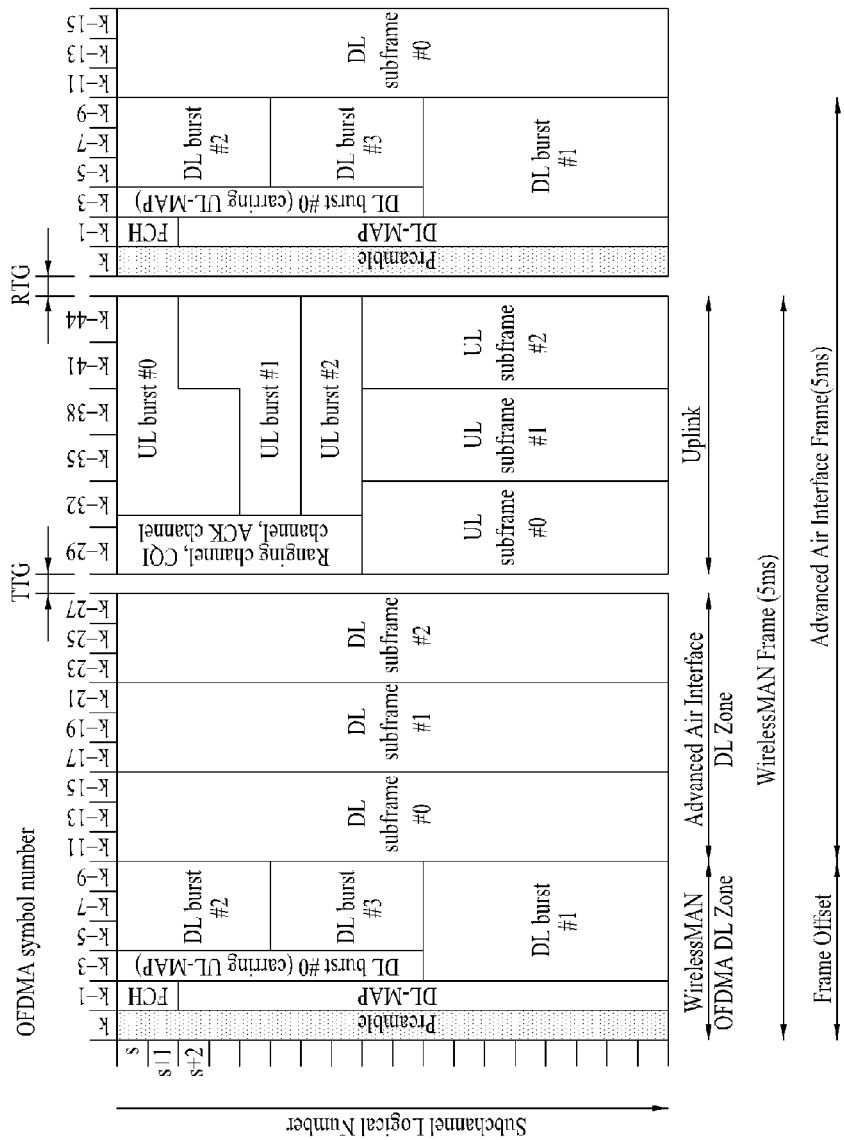
FIGS. 7 and 8 are diagrams illustrating examples of a TDD frame structure for supporting a WirelessMAM-OFDMA operation by uplink FDM and uplink TDM, respectively.
Figure 8:
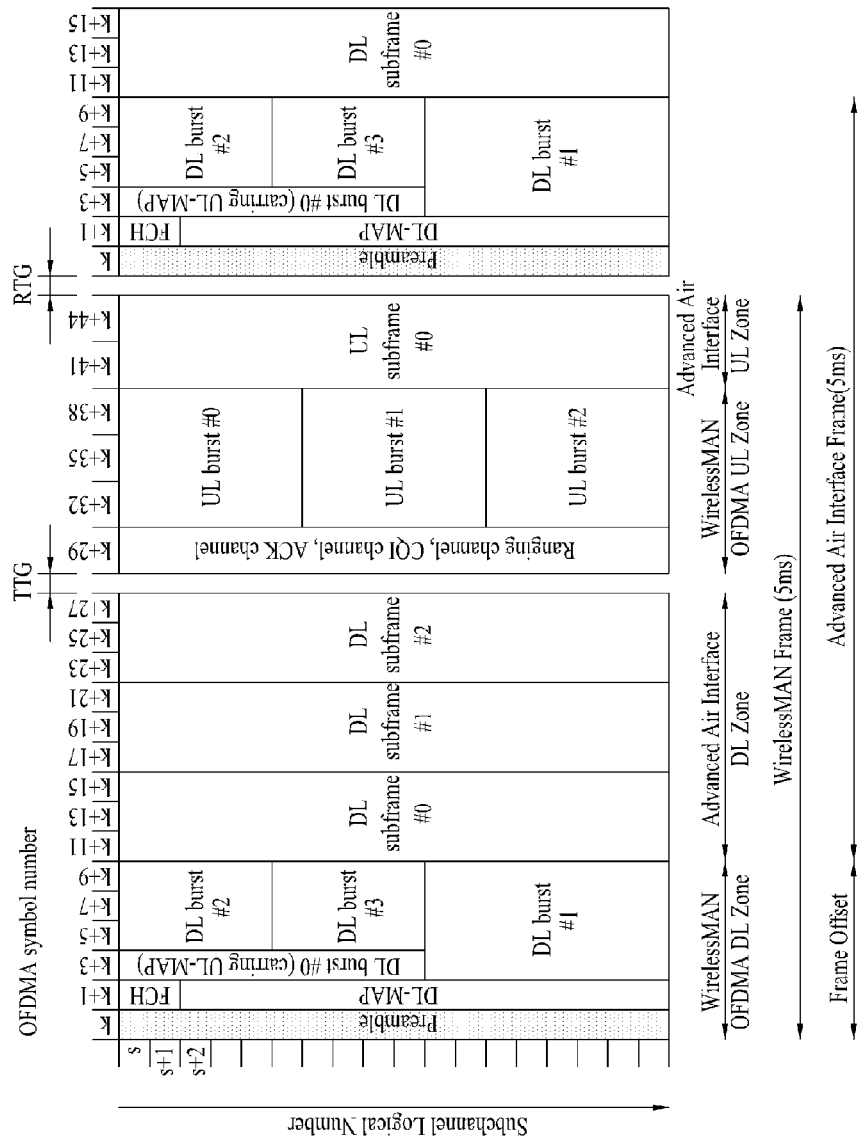

FIGS. 7 and 8 are diagrams illustrating examples of a TDD frame structure for supporting a WirelessMAN-OFDMA operation by UL FDM and UL TDM, respectively.

Referring to FIGS. 7 and 8, a frame refers to a data sequence during a fixed time used by physical specification. An OFDMA (Orthogonal Frequency Division Multiple Access) frame includes a UL frame and a DL frame. In TDD, UL and DL trans-missions share the same frequency but occur at different time intervals. The DL frame temporally precedes the UL frame.

The DL frame may be divided into a wireless metropolitan area network (WirelessMAN) OFDMA DL zone and an advanced air interface DL zone. In the DL frame, the WirelessMAN OFDMA DL zone (hereinafter, referred to as "L DL zone") may include a preamble, a frame control header (FCH), a DL-MAP, a UL-MAP, and DL burst regions. The advanced air interface DL zone (hereinafter, referred to as "M DL zone") may include system information for a 16 m mobile station.

The UL frame may be divided into a WirelessMAN OFDMA UL zone and an advanced air interface UL zone. In the UL frame, the WirelessMAN OFDMA UL zone (hereinafter, referred to as "L UL zone") may include a ranging channel, a channel quality indicator (CQI), an acknowledgement (ACK) channel, and UL burst regions. The advanced air interface UL zone (hereinafter, referred to as "M UL zone") is a UL zone for a new system mobile station.

To distinguish between the UL frame and the DL frame, a guard time is inserted into a middle part of the frame (i.e., between the DL frame and the UL frame) and into a last part of the frame (i.e., after the UL frame). TTG is a gap between a DL burst and a subsequent UL burst, and RTG is a gap between a UL burst and a subsequent DL burst.

The preamble is used for initial synchronization, cell search, frequency offset estimation, and channel estimation between a mobile station and a base station. The FCH includes information as to the length of a DL-MAP message length and the coding scheme of a DL-MAP. Here, the DL-MAP is a region where a DL-MAP message is transmitted. The DL-MAP message defines the access of a DL channel. The DL-MAP message includes a configuration change count of a downlink channel descriptor (DCD) and a base station identifier (ID). The DCD describes a DL burst profile applied to a current map. The DL burst profile refers to characteristics of a DL physical channel. The DCD is periodically transmitted by the base station through a DCD message.

The UL-MAP is a region where a UL-MAP message is transmitted. The UL-MAP message defines the access of a UL channel. The UL-MAP message includes a configuration change count of an uplink channel descriptor (UCD) and an effective start time of UL allocation defined by the UL-MAP. The UCD describes a UL burst profile. The UL burst profile refers to characteristics of a UL physical channel. The UCD is periodically transmitted by the base station through a UCD message. The UCD message may include information as to a backoff window for ranging.

Generally, a 16 m mobile station can improve performance compared with a legacy mobile station by performing UL/DL transmission using an advanced feature of an M UL zone. In this way, ranging of the 16 m mobile station can improve performance (for example, code detection capabilities in the base station) by introducing a new ranging scheme for the 16 m mobile station.

In a cell using a mixed zone structure for supporting the legacy mobile station, ranging channels may be respectively allocated to the L UL zone and the M UL zone. In this case, resource block mapping signaling for ranging channel allocation may be defined according to a resource mapping method of a 16 m zone. The above-described respective ranging channel allocation may be one method for supporting legacy but is ineffective in terms of utilization of radio resources. Therefore, a method may be considered which re-uses a ranging channel of the L UL zone allocated to the legacy mobile station, rather than additionally allocating the ranging channel to the M UL zone, with respect to a mobile station of a new system.

Hereinafter, a mobile station of a new system will be referred to as a 'mobile station' or a '16 m mobile station', and a mobile station of a legacy system will be referred to as a 'legacy mobile station'. A process for a mobile station to perform ranging through a ranging channel of an L UL zone applied to a legacy mobile station will be described in detail. At this time, a process for performing ranging may vary according to whether a ranging code used by the legacy mobile station and a ranging code used by the mobile station are separated from a code domain or are shared, and therefore two corresponding cases will be separately described.

Figure 9:
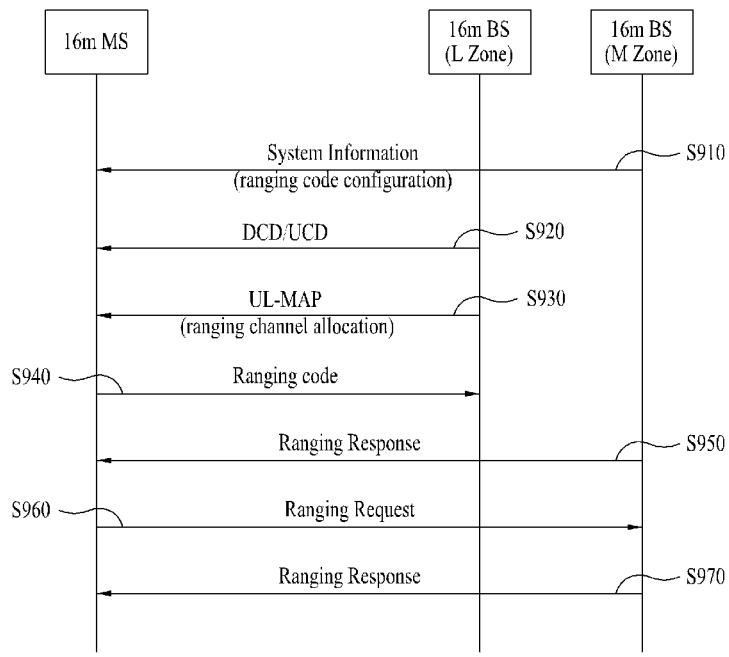
FIG. 9 is a diagram illustrating an example of a ranging process, when a mobile station re-uses a ranging channel of a legacy mobile station but ranging codes are separated.

FIG. 9 is a diagram illustrating an example of a ranging process, when a mobile station re-uses a ranging channel of a legacy mobile station but ranging codes are separated.

Referring to FIG. 9, a mobile station (MS) receives system information, which includes a ranging type, a preamble sequence index of an L DL zone, and information for generating ranging codes, from a base station (BS) through an M DL zone (step S910). Through the system information, the mobile station can obtain ranging configuration information necessary for performing ranging.

In the ranging configuration information, the ranging type refers to a ranging type of a corresponding cell to which the mobile station belongs. The ranging type indicates whether an additional ranging channel is allocated to the mobile station through the M UL zone or whether the mobile station re-uses a ranging channel of a legacy mobile station of the L UL zone. The ranging type may be indicated by one bit. For example, '0' may indicate that the mobile station re-uses the ranging channel and '1' may indicate that the mobile station uses a new ranging channel allocated to the M UL zone. Then the mobile station can recognize whether the legacy ranging channel is re-used. Therefore, if the mobile station receive the system information representing the ranging type of '0' from the base station, the mobile station can recognize that ranging is performed re-using the legacy ranging channel.

In addition, the mobile station may be synchronized with the L DL zone by receiving the preamble sequence index of the L DL zone included in the system information.

The base station may separately allocate a ranging code for ranging of the legacy mobile station and a ranging code for ranging of the mobile station on a domain. Namely, the base station can distinguish between the legacy mobile station and the mobile station by separating the ranging code used by the legacy mobile station and the ranging code used by the mobile station from a ranging code domain.

The legacy mobile station can obtain, through a UCD of the L DL zone, information (uplink permbase (UL_Permbase), start of a ranging code group, initial/periodic/bandwidth request/handover ranging codes, etc.) for generating the ranging code. Meanwhile, the mobile station can obtain information for generating the ranging code through the system information transmitted from the M DL zone.

The information for generating the ranging code may include a 7-bit or 8-bit seed sequence for generating a PRBS and a start index of a PRBS code of the mobile station indicating a start of a ranging code group allocated to the mobile station. The information for generating the ranging code may also include the number of a code for initial access, a code for periodic ranging, a code for bandwidth request ranging, and code for handover ranging, each code being 8 bits.

The system information may include a ranging interval and a frequency hopping pattern of a legacy ranging channel. The system information may also include a code type used for ranging, a root sequence (e.g., a root sequence of a constant amplitude zero autocorrelation (CAZAC) sequence such as a Zadoff-Chu (ZC) sequence) according to the code type, and a seed (e.g., a seed for generating a PRBS).

The mobile station then receives a DCD describing characteristics of a DL physical channel and a UCD describing characteristics of a UL channel from the base station through the L DL zone (step S920).

The mobile station then synchronized with the L DL zone receives a UL-MAP including ranging channel allocation information through the L DL zone from the base station (step S930). The ranging channel allocation information transmitted through the L DL zone may include a physical structure and channel allocation information for L UL transmission.

Thereafter, the mobile station transmits a ranging code distinguished from a ranging code of the legacy mobile station to the base station through the legacy ranging channel of the L UL zone based on the information for generating the ranging code obtained through the system information (step S940).

The mobile station then receives a ranging response message to the ranging code through the M DL zone from the base station (step S950).

Thereafter, the mobile station transmits, through the M UL zone, a ranging request message as a response to the ranging response message (step S960). The mobile station receives a ranging response message to the ranging request message through the M DL zone from the base station (step S970).

Figure 10:
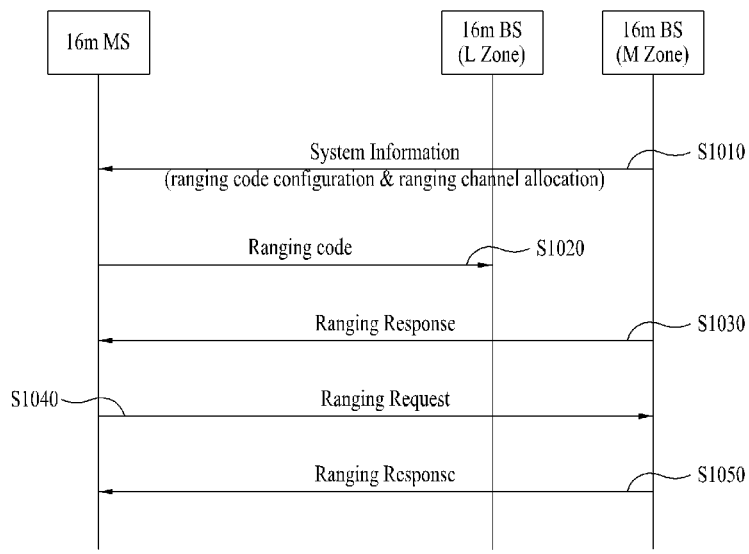
FIG. 10 is a diagram illustrating another example of a ranging process, when a mobile station re-uses a ranging channel of a legacy mobile station but ranging codes are separated.

FIG. 10 is a diagram illustrating another example of a ranging process, when a mobile station re-uses a ranging channel of a legacy mobile station but ranging codes are separated.

Referring to FIG. 10, a mobile station receives, through an M DL zone from a base station, system information which includes a ranging type, information for generating a ranging code, and ranging channel allocation information (step S1010). The mobile station can obtain from the ranging type whether a legacy ranging channel is re-used or an additional ranging channel is allocated thereto. In this exemplary embodiment, the mobile station can obtain information as to ranging channel allocation of an L UL zone as well as information as to PRBS code configuration through the system information of the M DL zone from the base station. The ranging channel allocation information may include a physical structure for UL transmission through the L UL zone, which is a part of information transmitted through a UCD of an L DL zone, and include information as to a UL-MAP information element (UL-MAP IE) for ranging channel allocation transmitted to an L DL zone. In this case, the mobile station does not need to additionally receive the UCD and a UL-MAP from the L DL zone.

The mobile station transmits a ranging code distinguished from a ranging code of a legacy mobile station to the base station through a legacy ranging channel of the L UL zone based on the information for generating the ranging code obtained through the system information (step S1020).

The mobile station then receives a ranging response message to the ranging code through the M DL zone from the base station (step S1030).

Thereafter, the mobile station transmits, through the M UL zone, a ranging request message as a response to the ranging response message (step S1040). The mobile station receives a ranging response message to the ranging request message through the M DL zone from the base station (step S1050).

Figure 11:
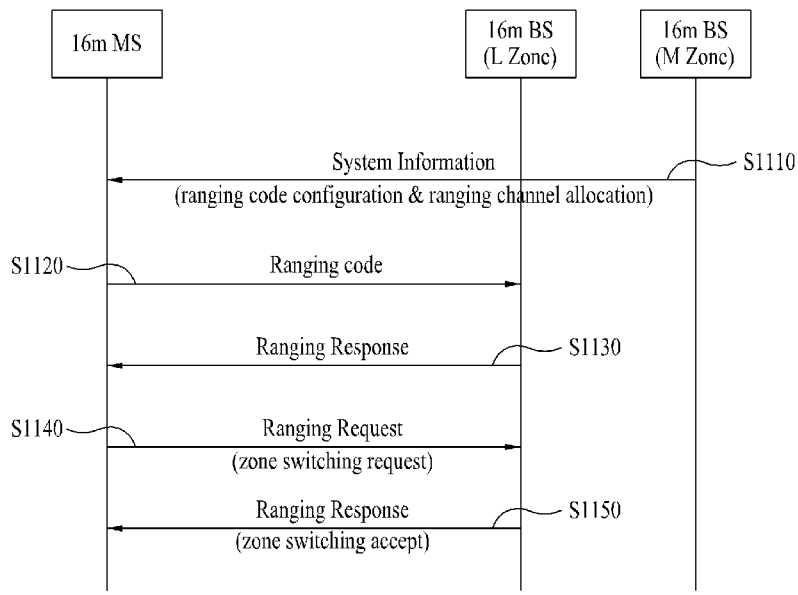
FIG. 11 is a diagram illustrating an example of a ranging process, when a mobile station re-uses a ranging channel of a legacy mobile station and shares a ranging code with the legacy mobile station.

FIG. 11 is a diagram illustrating an example of a ranging process, when a mobile station re-uses a ranging channel of a legacy mobile station and shares a ranging code with the legacy mobile station.

Referring to FIG. 11, a mobile station receives, through an M DL zone from a base station, system information including ranging type, information for generating a ranging code, and ranging channel allocation information (step S1110).

The mobile station can obtain from the ranging type whether a legacy ranging channel is re-used or an additional ranging channel is allocated thereto.

The mobile station can perform ranging using the same code set as that used by the legacy mobile station. To this end, the base station may transmit, to the mobile station, ranging configuration information transmitted through a UCD of an L DL zone together with the ranging type through the system information of the M DL zone. Namely, the mobile station can obtain information as to ranging channel allocation of an L UL zone as well as information as to PRBS code configuration through the system information of the M DL zone from the base station. The ranging channel allocation information may include a physical structure for UL transmission through the L UL zone, which is a part of information transmitted through the UCD of the L DL zone, and may include information as to a UL-MAP IE for ranging channel allocation transmitted from the L DL zone. In this case, the mobile station does not need to additionally receive the UCD and a UL-MAP from the L DL zone.

The mobile station then transmits a ranging code selected arbitrarily from a code group of a legacy mobile station and the mobile station to the base station through a legacy ranging channel of the L UL zone based on the information for generating the ranging code obtained through the system information (step S1120).

The mobile station then receives a ranging response message for the ranging code through the L DL zone from the base station (step S1130).

Thereafter, the mobile station transmits, through the M UL zone, a ranging request message to indicate that it is not a legacy mobile station but a mobile station of a new system and requesting that a zone for data transmission be switched from an L zone to an M zone (step S1140).

The mobile station then receives a ranging response message for accepting zone switching as a response to the ranging request message through the L DL zone from the base station (step S1150).

Figure 12:
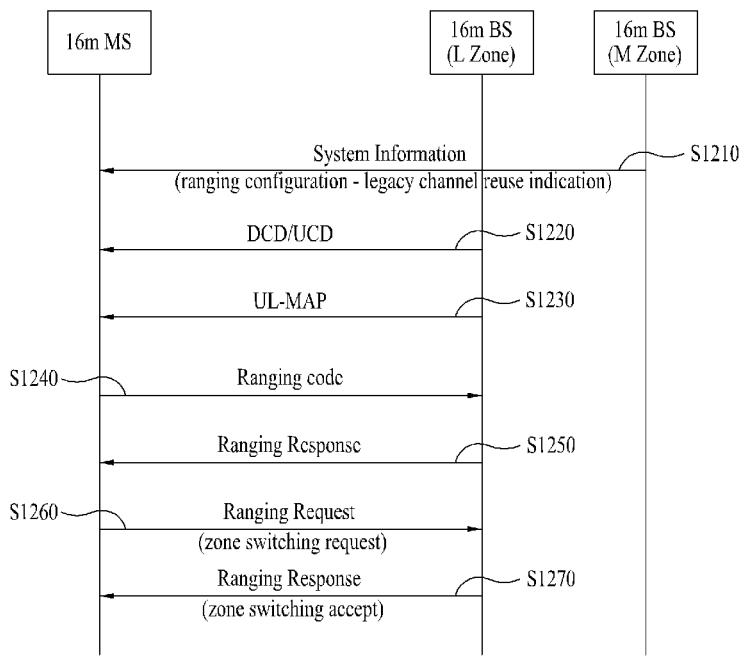
FIG. 12 is a diagram illustrating another example of a ranging process, when a mobile station re-uses a ranging channel of a legacy mobile station and shares a ranging code with the legacy mobile station.

FIG. 12 is a diagram illustrating another example of a ranging process, when a mobile station re-uses a ranging channel of a legacy mobile station and shares a ranging code with the legacy mobile station.

Referring to FIG. 12, a mobile station receives system information, which includes a ranging type and information for generating a preamble sequence index of an L DL zone and a ranging code, through an M DL zone from a base station (step S1210). The mobile station can than object from the ranging type whether a legacy ranging channel is re-used or an additional new ranging channel is used. The mobile station can be synchronized with the L DL zone by detecting a preamble sequence of the L DL zone.

Next, the mobile station receives a DCD describing characteristics of a DL physical channel and a UCD describing characteristics of a UL channel from the base station through the L DL zone (step S1220). The mobile station receives a UL-MAP including ranging channel allocation information (step S1230). The ranging channel allocation information transmitted through the L DL zone may include physical structure and channel allocation information for L UL transmission.

The mobile station then transmits a ranging code selected arbitrarily from a code group of the legacy mobile station and the mobile station to the base station through the legacy ranging channel of the L UL zone based on the information for generating the ranging code obtained through the system information (step S1240).

The mobile station then receives a ranging response message for the ranging code through the L DL zone from the base station (step S1250).

Thereafter, the mobile station transmits, through the M UL zone, a ranging request message to indicate that it is not a legacy mobile station but a mobile station of a new system and requesting that a zone for data transmission be switched from an L zone to an M zone (step S1260).

Next, the mobile station receives a ranging response message for accepting zone switching as a response to the ranging request message through the L DL zone from the base station (step S1270).

As described above, when the ranging channel of the legacy mobile station is re-used, a mapping method for a legacy zone (L UL zone) and a located ranging channel can be defined in consideration of a resource mapping format of a 16 m zone (M DL zone) and a signaling format therefor can be defined.

Furthermore, a problem caused by collision in the legacy ranging channel between a mobile station and a legacy mobile station does not occur when both mobile stations commonly use the legacy ranging channel.

According to the present invention, limited radio resources can be effectively employed by re-using the ranging channel of the legacy mobile station.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR THE INVENTION

Various embodiments have been described in the best mode for carrying out the invention.

INDUSTRIAL APPLICABILITY

The method for performing ranging in wireless communication system supporting two wireless communication schemes according to the present invention is applicable industrially.

The invention claimed is:

1. A method for performing, at a mobile station, ranging in a wireless communication system which simultaneously supports a first communication scheme and a second communication scheme, the method comprising: receiving, at a second mobile station using the second communication scheme, system information, which includes information indicating a ranging channel to be used by the second mobile station, from a base station; and transmitting a ranging code selected arbitrarily from the same code set used by a first mobile station using the first communication scheme to the base station through a ranging channel according to the first communication scheme, when the system information indicates that the second mobile station uses the ranging channel according to the first communication scheme.

2. The method according to claim 1, further comprising transmitting the ranging code to the base station through a ranging channel according to the second communication scheme, when the system information indicates that the second mobile station uses the ranging channel according to the second communication scheme.

3. The method according to claim 1, wherein the system information further includes ranging code configuration information.

4. The method according to claim 1, further comprising: transmitting a message for a zone switching request to the base station so that the second mobile station using the second communication scheme transmits data in a zone different from a zone used by the first mobile station using the first communication scheme; and receiving a message for accepting the zone switching request from the base station.

5. A method for performing, at a base station, ranging in a wireless communication system which simultaneously supports a first communication scheme and a second communication scheme, the method comprising:
transmitting system information, which includes information indicating a ranging channel to be used by a second mobile station using the second communication scheme, to the second mobile station; and
receiving a ranging code selected arbitrarily from the same code set used by a first mobile station using the first communication scheme within a ranging code region through a ranging channel according to the first communication scheme, when the system information indicates that the second mobile station uses the ranging channel according to the first communication scheme.

6. The method according to claim 5, further comprising, receiving the ranging code from the second mobile station using the second communication scheme through a ranging channel according to the second communication scheme, when the system information indicates that the second mobile station uses the ranging channel according to the second communication scheme.

7. The method according to claim 5, wherein the system information further includes ranging code configuration information.

8. The method according to claim 5, further comprising: receiving a message for a zone switching request from the second mobile station using the second communication scheme so that the second mobile station transmits data in a zone different from a zone used by the first mobile station using the first communication scheme; and transmitting a message for accepting the zone switching request to the second mobile station using the second communication scheme.

* * * * *